United States Patent
Bärgman et al.

(10) Patent No.: US 6,421,592 B1
(45) Date of Patent: Jul. 16, 2002

(54) SAFETY ARRANGEMENT IN A VEHICLE

(75) Inventors: Jonas Bärgman, Göteborg; Dion Kruse, Alingsås, both of (SE)

(73) Assignee: Autoliv Development AB, Vårgårda (SE)

(*) Notice: Subject to any disclaimer, the term of this patent is extended or adjusted under 35 U.S.C. 154(b) by 0 days.

(21) Appl. No.: 09/646,286

(22) PCT Filed: Mar. 11, 1999

(86) PCT No.: PCT/SE99/00372

§ 371 (c)(1),
(2), (4) Date: Dec. 11, 2000

(87) PCT Pub. No.: WO99/47384

PCT Pub. Date: Sep. 23, 1999

(30) Foreign Application Priority Data

Mar. 17, 1998 (GB) .............................................. 9805692

(51) Int. Cl.⁷ .............................................. B60R 21/00
(52) U.S. Cl. .......................... 701/45; 180/271; 180/282; 280/756; 280/728.1
(58) Field of Search ........................... 701/45; 180/271, 180/282; 280/756, 728.1; 340/440

(56) References Cited

U.S. PATENT DOCUMENTS 5,262,949 A    11/1993   Okano et al.

FOREIGN PATENT DOCUMENTS

| EP | 0 053 516 | 6/1982 |
|---|---|---|
| EP | 0 430 813 | 6/1991 |
| EP | 0 440 133 | 8/1991 |
| WO | 87/05570 | 9/1987 |
| WO | 97/33774 | 9/1997 |
| WO | 97/33775 | 9/1997 |
| WO | 97/49571 | 12/1997 |
| WO | 97/49578 | 12/1997 |
| WO | 98/29280 | 7/1998 |
| WO | 99/47384 | 9/1999 |

*Primary Examiner*—Michael J. Zanelli
*Assistant Examiner*—Eric Gibson
(74) *Attorney, Agent, or Firm*—Venable; Robert Kinberg

(57) ABSTRACT

A safety arrangement in a motor vehicle comprises a safety device (38) adapted to protect an occupant of the vehicle in the case of a roll-over accident, and a roll sensor arrangement to provide a signal (33) to trigger activation of the safety device. A sensor (30) senses an angular parameter such as angular speed about the longitudinal axis of the vehicle, or the actual angle of roll about the longitudinal axis of the vehicle. A further sensor (31) senses a velocity parameter relating to the vehicle speed, such as the total velocity of the vehicle, or the velocity of the vehicle in a predetermined direction. A processor (35) senses an angular speed in excess of a predetermined threshold, which activates a timing mechanism (36) which is associated with a processor (34) which compares angular velocity with a threshold, and provides a triggering signal if the threshold is exceeded. The threshold is a function of vehicle speed. The angular velocity is also compared with a further threshold in another processor (32), the threshold in this processor being a function of angle of roll. If this processor generates an output signal, the safety device (38) is activated.

9 Claims, 4 Drawing Sheets

SAFETY ARRANGEMENT IN A VEHICLE

BACKGROUND OF THE INVENTION

THE PRESENT INVENTION relates to a safety arrangement, and more particularly relates to a safety arrangement in a vehicle such as a motor car.

A substantial proportion of all fatal accidents involving motor vehicles are accidents in which the motor vehicle rotates through at least 90° a around the longitudinal axis, the x axis of the vehicle. Such an accident is termed a roll-over accident.

The roll of the vehicle may be initiated by several different mechanisms. For example, the vehicle may slide into a curb or some other solid object, or may drive or slide into a ditch or down a slope. The vehicle may also slide across a surface which has a relatively high coefficient of friction, such as the surface of a road, or soil. For example, one or more wheels of the vehicle may slide into soil at the edge of the road. In the case of sliding into a solid obstacle or on to soil, the force that acts on the vehicle due to the contact of the wheels of the vehicle with the obstacle or the soil effectively "trips" the vehicle into a roll-over.

In a typical roll-over accident there is a substantial risk that the driver or occupant of the vehicle will be ejected from the vehicle. Typical injuries that arise in such an accident are injuries to the head or face region, and in most cases these injuries are due to contact with the ground due to full or partial ejection from the vehicle.

It has been proposed to provide a safety arrangement in a motor vehicle in which an inflatable element is provided which, when inflated, forms a curtain that extends adjacent the driver or occupant of the vehicle, being located between the driver or occupant of the vehicle and the door or window opening at the side of the vehicle. An inflatable element of this type may be termed "an inflatable curtain". However, such an inflatable element must be inflated at an appropriate time to provide protection for the driver or occupant of the vehicle during a roll-over accident.

Whilst various sensors have been provided to initiate inflation of an inflatable element such as an inflatable curtain, it has been found that such sensors may not always provide an appropriate triggering signal for the deployment of the safety device, especially if the vehicle is involved in a soil tripped, or a curb tripped roll-over.

SUMMARY OF THE INVENTION

The present invention seeks to provide an improved safety arrangement.

According to this invention there is provided a safety arrangement in a vehicle, the safety arrangement comprising a safety device adapted to protect an occupant of the vehicle in the case of a roll-over accident, and a roll sensor arrangement adapted to provide a signal to trigger activation of said safely device, said signal being provided in case a roll or an anticipated roll of the vehicle is detected, the roll sensor arrangement being responsive to both a) an angular parameter selected from the angular speed ($\omega_x$) around the longitudinal axis of the vehicle, or the actual angle of roll ($\alpha_x$) about the longitudinal axis of the vehicle, and b) a velocity parameter relating to the vehicle speed selected from the total velocity of the vehicle, or the velocity of the vehicle in a predetermined direction. The total velocity of the vehicle may comprise the longitudinal velocity of the vehicle, and the velocity of the vehicle in a predetermined direction may comprise the lateral velocity of the vehicle.

Preferably said roll sensor arrangement is responsive to angular speed of the vehicle around the longitudinal axis of the vehicle, and is also responsive to the total velocity of the vehicle or a component of the velocity of the vehicle, such as the longitudinal velocity or the lateral velocity.

Conveniently the roll sensor arrangement comprises an angular speed sensor to measure said angular speed ($\omega_x$) and a speedometer to measure the longitudinal velocity of the vehicle, Advantageously the signal is generated only if the instantaneous angular speed of the vehicle reaches a predetermined threshold, the said threshold being a function of the velocity of the vehicle or the velocity of the vehicle in a predetermined direction.

In one embodiment the invention, the function of vehicle velocity is a function of the longitudinal velocity of the vehicle.

In an alternative embodiment the said function of vehicle velocity is a function of the lateral velocity of the vehicle.

Conveniently the angular speed of the vehicle is compared with a predetermined reference valve and, if the angular speed of the vehicle exceeds the reference speed, timing means are activated to measure a predetermined period of time, the timing means enabling the safety arrangement to permit triggering due to said velocity dependent threshold being reached only during the predetermined period of time.

Advantageously the signal is generated if the angular velocity ($\omega_x$) exceeds a predetermined threshold which is a function of the total velocity of the vehicle, or a component of the velocity of the vehicle, or if the angular velocity exceeds a threshold which is a function of the existing roll angle of the vehicle.

Conveniently the sensor arrangement comprises means to determine the instantaneous lateral acceleration of the vehicle, and means to inhibit triggering unless the lateral acceleration of the vehicle exceeds a predetermined threshold.

BRIEF DESCRIPTION OF THE DRAWINGS

In order that the invention may be more readily understood, and so that further features thereof may be appreciated, the invention will now be described, by way of example, with reference to the accompanying drawings which.

DETAILED DESCRIPTION OF THE INVENTION

Figure 1:
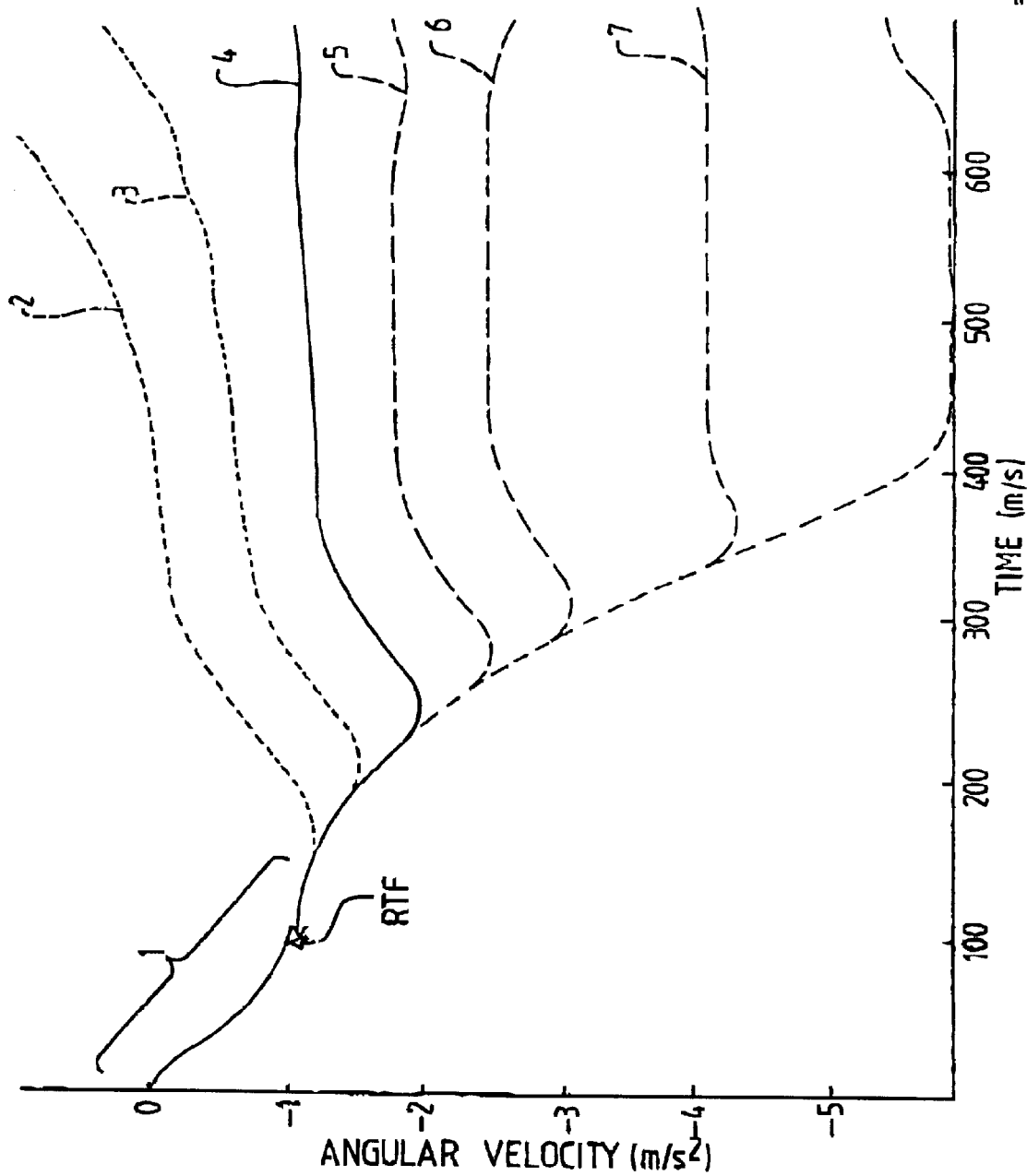
FIG. 1 is a graphical figure illustrating angular velocity of a motor vehicle plotted against time showing various plots, with some plots relating to a situation in which the vehicle rolled, and other plots relating to a situation in which the vehicle did not roll.

Referring initially to FIG. 1 of the accompanying drawings, the figure comprises a plot of the angular velocity of a vehicle (rotation about longitudinal axis) against time for a plurality of experiments conducted with a motor vehicle in which the vehicle was subjected to conditions likely to give rise to a soil tripped roll. The vehicle, in each experiment, moved laterally across a surface with a predetermined constant coefficient of friction ($\mu$), but had a different initial lateral speed. In each case the initial angular velocity of the vehicle was the same, as shown at region 1 of the graph, where all the plots are substantially super-imposed. The point RTF shown on the graph is the "required time to fire" and indicates the instant at which a safety device should be actuated if there is a roll-over situation if the safety device is to provide adequate protection for an occupant of the vehicle.

In certain situations, shown in finely dotted lines 2,3, the vehicle did not roll, because the lateral speed of the vehicle after the "trip" was not sufficient to "lift" the vehicle to a position in which a roll was inevitable.

In a further plot, shown in a solid line as plot 4, the vehicle did roll. Plot 4 actually represents the limit condition for the occurrence of a roll. In further plots where the vehicle had a higher lateral speed after the "trip" shown as plots 5,6,7, the vehicle did roll.

It can be seen that, in FIG. 1, after 100 milliseconds, all of the plots are substantially super-imposed, meaning that it would be impossible to generate any meaningful signal concerning whether a vehicle is in a "roll" or a "no roll" situation at 100 milliseconds. Indeed, at 175 milliseconds, plot 3 is still super-imposed with plot 4, meaning that even at this instant it is not possible to determine, from angular velocity, whether a vehicle is in a "roll" or "no roll" situation. Plot 4 is the first plot that does lead to a roll, and this diverges from other plots only after 200 milliseconds.

It is to be appreciated that in the case of a roll-over, it would be important for the side curtain, or other safety device being used to protect the driver or occupant of the vehicle, to be actuated at the instant RTF, which is before the plots of angular velocity diverge. Thus angular velocity alone is not an appropriate parameter to use to generate a trigger signal to actuate the safety device.

Figure 2:
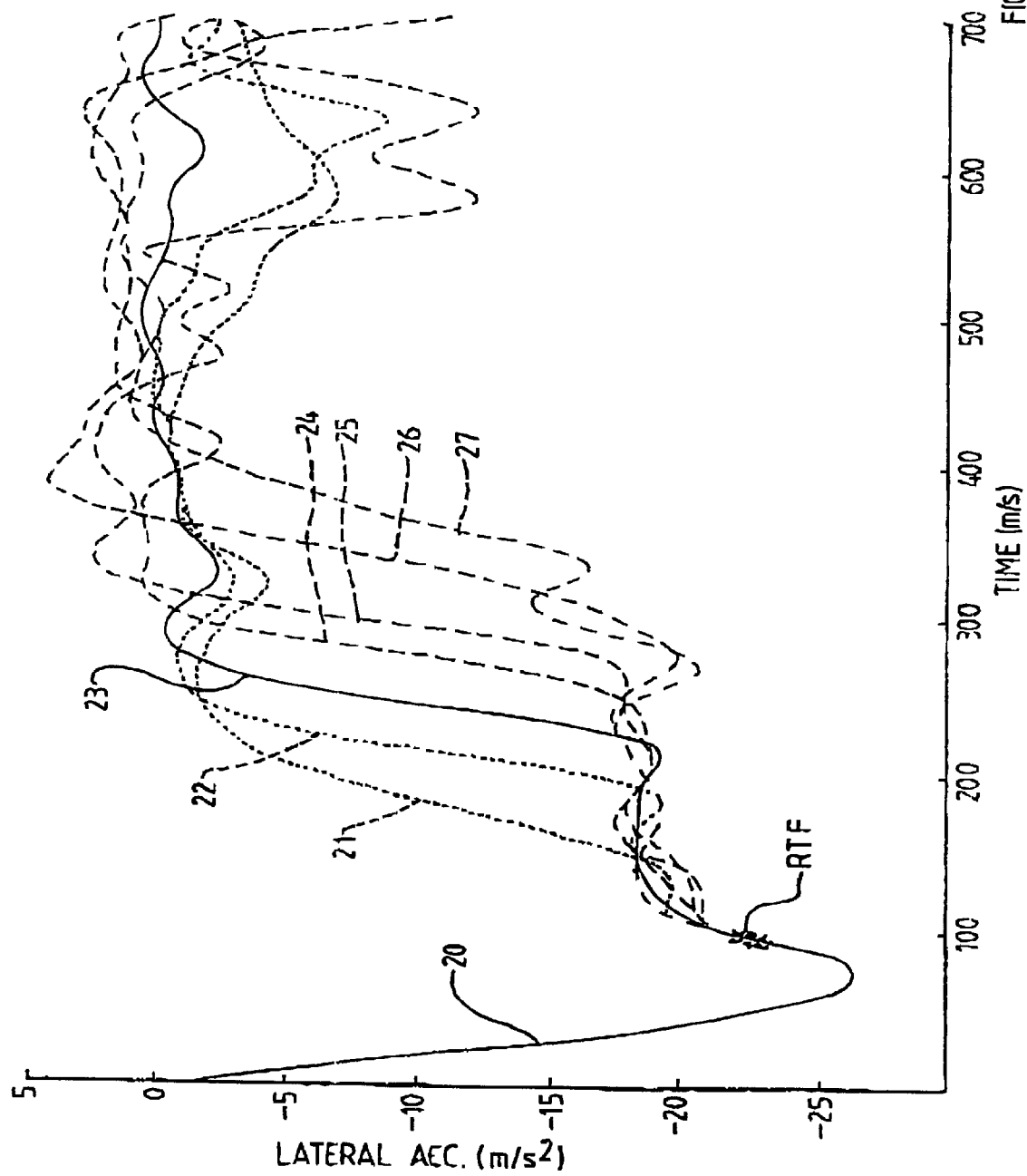
FIG. 2 is a graphical figure plotting lath acceleration against time for a motor vehicle, with the figure again having a number of plots showing, in some cases a vehicle which was subjected to roll, and in other cases a vehicle which was not subjected to a roll.

Turning now to FIG. 2 in which lateral acceleration of the vehicle is plotted against time, for the same experiments, it can again be seen that the graph incorporates a section 20 in which all of the plots are super-imposed, and the plots remain super-imposed certainly until 100 milliseconds into the accident. It is only about 100 milliseconds that the plots begin to diverge. After about 150 milliseconds, it can be seen that the plots have diverged to form two dotted lines 21,22 which relate to no roll situations, and a further solid line 23 which is the roll situation, with other plots 24,25,26,27. It can be seen that again it would be difficult to distinguish between a "roll" and a "no roll" situation until approximately 200 milliseconds had elapsed. The point RTF indicating the instant at which the safety device should be actuated if there is a roll-over situation, if the safety device is to provide adequate protection for an occupant of the vehicle, is shown, and this point is before the super-imposed plots diverge. Thus, lateral acceleration of the vehicle is not an appropriate parameter to use to generate a trigger signal for the safety device.

It is thus difficult to be able to distinguish whether a vehicle will roll during the first 150–200 milliseconds, after a "trip" which may cause a roll, whereas, if the safety device is to be actuated in time, actuation must commence before this period has elapsed.

It has however been discovered for the soil and curb cases, the condition for roll-over is dependent upon the initial lateral velocity, $v_y$ (which in turn is dependent on the initial longitudinal velocity of $e_x$) and the coefficient of friction ($\mu$) between the soil and the vehicle. A curb could be considered to correspond to a very high coefficient of friction, e.g. $\mu$ is greater than 3.0.

If the coefficient of friction, $\mu$ is big enough, the lateral force acting on the wheels below the centre of gravity will create a torque big enough to lift one side of the vehicle. As the vehicle is sliding laterally, the lateral kinetic energy (corresponding to $v_y$) will gradually be transferred to rotational energy, and/or heat generated by the sliding wheels as a consequence of friction.

A roll-over will occur only if the vehicle has gained enough rotational energy for a roll to be initiated before all the lateral speed has been consumed.

On the other hand, if the coefficient of friction $\mu$ is big enough, the torque will gradually create an angular speed, which it is possible to measure.

Figure 3:
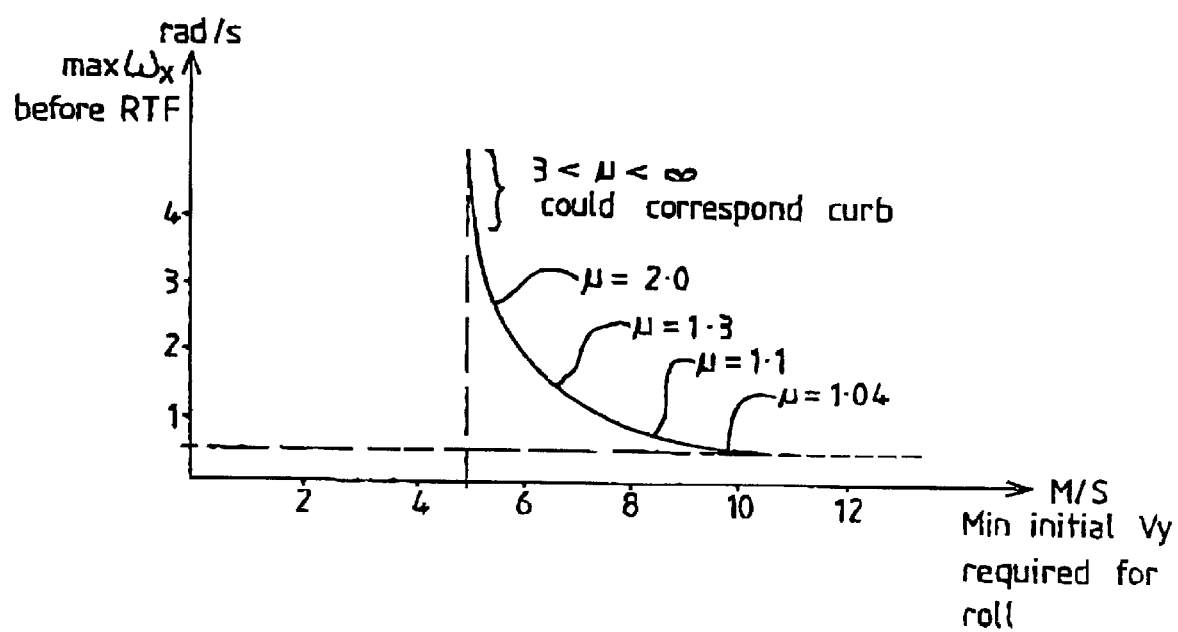
FIG. 3 is a further graphical figure plotting the maximum angular velocity of a specific motor vehicle that occurs before a required time to fire (RTF) of a safety device against the initial velocity in the lateral direction.

FIG. 3 is a graph showing, for one specific vehicle, the maximum angular speed before "required time to fire" (RTF) as a function of the minimum initial lateral velocity of the vehicle to produce a roll-over, for soil and curb cases. The different points on the graph represent different coefficients of friction $\mu$.

For the $_{y,limit}$ less than 5 m/s, the kinetic lateral energy is smaller than the energy required for a roll. In other words, if the vehicle only has a very low lateral energy, then the vehicle will not roll.

If the coefficient of friction $\mu$ is too small (less than 1.04), the torque will be too small to lift the vehicle and thus a roll will never occur no matter how large the initial lateral velocity. In other words, if the surface on which the vehicle is sliding is extremely slippery, the vehicle will not roll. In the graph this corresponds to $\omega_x$, max always being bigger than 0.5 RAD/S.

In the light of the discovery that a "roll" situation can be predicted by considering angular velocity and lateral velocity, the present inventors have derived a new algorithm or, alternatively, an apparatus for performing an algorithm which, it is believed, will provide an adequate triggering signal for a safety device within a relatively short period of time after commencement of a roll-over accident.

Figure 4:
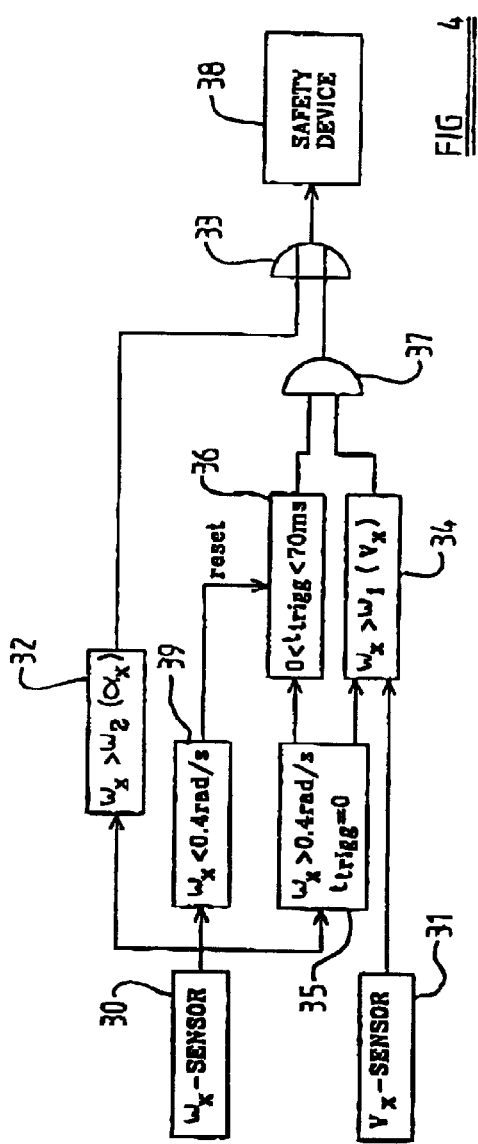
FIG. 4 is a block diagram of one embodiment of the present invention.

Referring now to FIG. 4 of the according drawings, a block diagram is provided showing one embodiment of the invention in the form of a roll sensor arrangement adapted to provide a signal to trigger actuation of a safety device in the case where a roll or an anticipated roll of the vehicle is detected.

Referring now to FIG. 4, a first sensor 30 is provided which is in the form of a sensor to sense the speed of rotation of the vehicle, in terms of radians per second, about the longitudinal or x axis. This parameter is termed $\omega_x$.

The apparatus also incorporates a sensor 31 adapted to sense the initial velocity of the vehicle. The velocity that is measured is the velocity in the longitudinal direction of the vehicle, and thus the velocity is expressed in terms of $v_x$, where x is the longitudinal axis of the vehicle. This velocity sensor may, of course, comprise the speedometer of the vehicle.

It is to be appreciated that lateral velocity may well be closely related with the initial longitudinal velocity for a vehicle, especially if the vehicle is in a sliding and/or spinning situation where, if the vehicle slides and skews, or spins as it slides, longitudinal velocity may be translated partially, or almost wholly into lateral velocity. In fact all lateral velocity originates from longitudinal velocity.

The output of the sensor 30 is provided to an initial processor 32 where the angular velocity $\omega_x$ is compared with a reference value $\omega_2(\alpha_x)$. The reference value is a function of the instantaneous angle of roll $\alpha x$ of the vehicle, which is calculated by integrating angular velocity $\omega_x$. Thus $$\alpha_x = \int \omega_x dt$$

Consequently the reference value varies with regard to the actual angle of roll that has already been executed by the vehicle. If the vehicle has already executed a substantial roll, for example by rotating by approximately 40° about the x axis, only a very low angular speed is necessary to cause the vehicle to pass beyond the point of no return, that is to say when the centre of gravity of the vehicle passes beyond a point located vertically above the wheel or wheels or the vehicle that remain in contact with the ground, when a roll is inevitable. The algorithm of processor 32 could, for example, be $\omega_x > (k_1 - k_2 \cdot \alpha_x)$ when $k_1$ and $k_2$ are constants. The output of the processor 32 is fed to an OR gate 33.

The output of the sensor 30 is also provided via a discriminator 35 to a second processor 34, and the output of the velocity sensor 31 is also fed to the second processor 34. In the processor 34 the instantaneous speed of rotation about the x axis, $\omega_x$ is compared with a reference which is $\omega_1(v_x)$, which is a function of the initial velocity of the vehicle. In general terms, the greater the initial velocity of the vehicle, the lower the rotational speed that is required to cause a roll-over to occur, The function $\omega_1(v_x)$ could be chosen as the graph of FIG. 3, substituting $\omega_x$ max with $\omega_1$ and initial lateral velocity $v_y$ with initial longitudinal velocity $v_x$. The function should include the horizontal line to the right of 10 m/s.

It has been determined that the output signal provided by the processor 34 as described above, provides a valuable result for triggering the activation of a safety device only during a first predetermined period of time after a roll-over or potential roll-over situation commences. However, after that period of time, the signal becomes far less reliable and triggering is then only possible via processor 32. Thus, in the arrangement shown in FIG. 4, the output of the sensor 30 is provided to the discriminator 35 which determines when the angular speed of the vehicle about the x axis is greater than a predetermined threshold, in this example, 0.4 radians per second. When the instantaneous angular speed of the vehicle exceeds this threshold, the discriminator 35 provides signals which initiates both the processor 34 and a timer 36. The timer 36 runs for a predetermined period of time, in the example given, a period of 70 milliseconds, and during that period of time, the timer provides an output signal. The output signal from the timer 36 is fed, together with the output signal of the processor 34 to an AND gate 37, the output of which forms a second input to the OR gate 33. The output of the OR gate 33 is used to trigger actuation of a safety device 38 which may comprise an inflatable curtain.

The timer 36 will be re-set by a re-set device 39 when, and only when $\omega_x$ drops below 0.4 RAD/S, and will not be able to start again until such a re-set has occurred.

The effect of this is that if angular velocity exceeds a threshold related to the initial speed of the vehicle within a predetermined period of time after a high angular velocity has been detected, a trigger signal will be generated. If, however, at any time, an angular velocity which is greater than a threshold related to angle of roll is detected, again a trigger signal will be generated.

Figure 5:
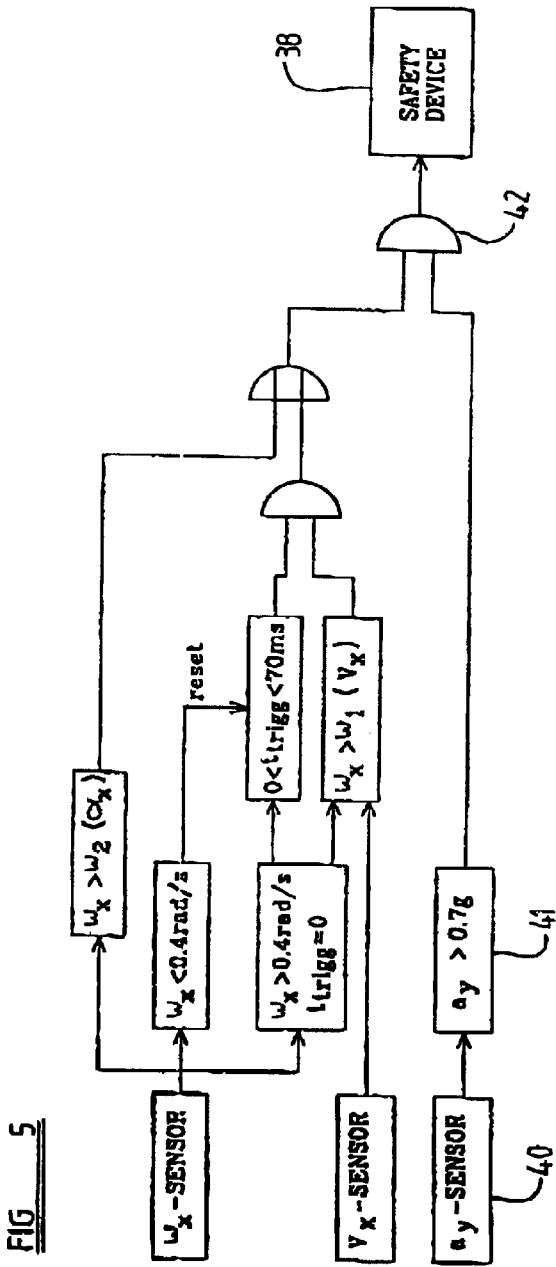
FIG. 5 is a more detailed block diagram of a second embodiment of the invention.

Referring now to FIG. 5 of the drawings, an arrangement which is equivalent to that shown in FIG. 4 is illustrated, but with the addition of a "arming" arrangement required for triggering the safety device.

In the arrangement shown in FIG. 5, a sensor arrangement 40 is provided which provides sensor signals indicative of angular velocity ($\omega$), lateral acceleration ($a_y$) and also vehicular speed ($v_{initial}$).

The sensor arrangement is connected to a first discriminator 41 which determines when the lateral acceleration exceeds a predetermined threshold which, in this example, is 0.7 g. When the lateral acceleration does exceed this threshold, the comparator 41 provides an output signal which is supplied to a "AND" gate 42. The other input of the AND gate 42 is the output of the OR gate 33 described above, the output of the AND gate 42 is the trigger signal to actuate the safety device 38.

The output of the AND gate 42 is connected to a trigger arrangement 49.

It is thus to be appreciated that, in the embodiment described, the arrangement is only "armed" if lateral acceleration $a_y$ exceeds a predetermined threshold. If lateral acceleration does not exceed this threshold, the AND gate 42 is always inhibited.

It is envisaged that the safety device, in the described embodiment of the invention, could for example comprise an inflatable curtain.

What is claimed is:

1. A safety arrangement in a vehicle, the safety arrangement comprising a safety device adapted to protect an occupant of the vehicle in the case of a roll-over accident, and roll sensor arrangement adapted to provide a signal to trigger activation of said safety device, said signal being provided in case a roll or an anticipated roll of the vehicle is detected, the roll sensor arrangement being responsive to both,
  a) the angular speed ($\omega_x$) around the longitudinal axis of the vehicle, and
  b) a velocity parameter relating to the vehicle speed selected from the total velocity of the vehicle, or the velocity of the vehicle in a predetermined direction, wherein the signal is generated only if the instantaneous angular speed of the vehicle reaches a predetermined threshold, said threshold being a function of the velocity of the vehicle or the velocity of the vehicle in a predetermined direction.

2. An arrangement according to claim 1 wherein the roll sensor arrangement comprises an angular speed sensor to measure said angular speed ($\omega_x$) and a speedometer to measure the longitudinal velocity of the vehicle.

3. An arrangement according to claim 1 wherein the said function of vehicle velocity is a function of the longitudinal velocity of the vehicle.

4. An arrangement according to claim 1 wherein the said function of vehicle velocity is a function of the lateral velocity of the vehicle.

5. An arrangement according to claim 4 wherein the angular speed of the vehicle is compared with a predetermined reference angular speed and, if the angular speed of the vehicle exceeds the reference angular speed, timing means are activated to measure a predetermined period of time, the timing means enabling the safety arrangement to permit triggering due to said velocity dependent threshold being reached only during the predetermined period of time.

6. An arrangement according to claim 5 wherein the signal is generated if the angular velocity ($\omega_x$) exceeds a predetermined threshold which is a function of the total velocity of the vehicle, or a component of the velocity of the vehicle, or if the angular velocity exceeds a threshold which is a function of the existing roll angle of the vehicle.

7. An arrangement according to claim 1 wherein the sensor arrangement comprises means to determine the instantaneous lateral acceleration of the vehicle, the means to inhibit triggering unless the lateral acceleration of the vehicle exceeds a predetermined threshold.

8. A safety arrangement in a vehicle comprising a safety device and a roll sensor arrangement that provides a signal to trigger actuation of the safety device, said roll sensor arrangement comprising:

a first sensor that senses the speed of rotation of the vehicle about the longitudinal axis of the vehicle, the speed of rotation being the angular velocity ($\omega_x$) of the vehicle;

a second sensor provided to sense the initial velocity of the vehicle in the longitudinal direction of the vehicle;

a first processor receives the output of the first sensor, the sensed angular velocity ($\omega_x$) of the vehicle being compared with a first reference value that is a function of the instantaneous angle of roll;

a discriminator additionally receives the output of the first sensor and determines if the angular velocity of the vehicle exceeds a predetermined threshold before outputting a signal that initiates a timer and a second processor where the timer runs for a predetermined period of time during which the timer outputs a signal and the second processor receives the output of the discriminator and additionally receives the output of the second sensor, the second processor comparing the instantaneous angular velocity ($\omega_x$) with a second reference value that is a function of the initial velocity of the vehicle and outputting a signal; and a re-set device that receives the output of the first sensor and re-sets the timer when the angular velocity ($\omega_x$) drops below approximately 0.4 rad/sec where the output signal of the timer is fed together with the output signal of the second processor to an AND gate, and the output of the AND gate and the output of the first sensor are fed to an OR gate which triggers the activation of the safety device.

9. A safety arrangement in a vehicle comprising a safety device and a roll sensor arrangement that provides a signal to trigger actuation of the safety device, said roll sensor arrangement comprising:

a first sensor that senses the speed of rotation of the vehicle about the longitudinal axis of the vehicle, the speed of rotation being the angular velocity ($\omega_x$) of the vehicle;

a second sensor provided to sense the initial velocity of the vehicle in the longitudinal direction of the vehicle;

a first processor receives the output of the first sensor, the sensed angular velocity ($\omega_x$) of the vehicle being compared with a first reference value that is a function of the instantaneous angle of roll;

a first discriminator additionally receives the output of the first sensor and determines if the angular velocity of the vehicle exceeds a predetermined threshold before outputting a signal that initiates a timer and a second processor where the timer runs for a predetermined period of time during which the timer outputs a signal and the second processor receives the output of the discriminator and additionally receives the output of the second sensor, the second processor comparing the instantaneous angular velocity ($\omega_x$) with a second reference value that is a function of the initial velocity of the vehicle and outputting a signal;

a sensor arrangement that outputs a sensor signal indicative of lateral acceleration ($a_y$);

a second discriminator that receives the output of the sensor arrangement and compares the sensor signal indicative of lateral acceleration ($a_y$) with a predetermined threshold value; and a re-set device that receives the output of the first sensor and re-sets the timer when the angular velocity ($\omega_x$) drops below approximately 0.4 rad/sec where the output signal of the timer is fed together with the output signal of the second processor to a first AND gate, the output of the AND gate and the output of the first sensor are fed to an OR gate and if the second discriminator determines that the predetermined threshold is exceeded an output signal is provided to a second AND gate along with the output of the OR gate to trigger the activation of the safety device.

* * * * *